United States Patent
Ott et al.

(10) Patent No.: US 7,122,595 B1
(45) Date of Patent: *Oct. 17, 2006

(54) POWDER-SLURRY THAT CAN BE HARDENED BY ACTINIC RADIATION OR BY THERMAL MEANS, METHOD FOR PRODUCING SAID SLURRY AND USE OF THE SAME

(75) Inventors: Günther Ott, Münster (DE); Ulrike Röckrath, Senden (DE); Uwe Meisenburg, Duisburg (DE); Hubert Baumgart, Münster (DE); Reinhold Schwalm, Wachenheim (DE); Erich Beck, Ladenburg (DE); Rainer Königer, Ludwigshafen (DE); Wolfgang Paulus, Mainz (DE); Horst Binger, Mainz (DE); Rainer Blum, Ludwigshafen (DE)

(73) Assignee: BASF Coatings AG, Munster (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/889,818

(22) PCT Filed: Feb. 2, 2000

(86) PCT No.: PCT/EP00/00836

§ 371 (c)(1),
(2), (4) Date: Nov. 15, 2001

(87) PCT Pub. No.: WO00/50519

PCT Pub. Date: Aug. 31, 2000

(30) Foreign Application Priority Data

Feb. 25, 1999 (DE) .................. 199 08 018

(51) Int. Cl.
C08L 37/00 (2006.01)
C08L 33/00 (2006.01)
C08L 67/00 (2006.01)
C08L 83/00 (2006.01)

(52) U.S. Cl. .............. 524/502; 524/506; 524/507; 524/513; 524/517; 524/811; 523/400; 523/502; 525/208; 525/222

(58) Field of Classification Search ........... 523/400, 523/502; 524/502, 506, 507, 513, 517, 811; 525/208, 222
See application file for complete search history.

(56) References Cited

U.S. PATENT DOCUMENTS

| | | | |
|---|---|---|---|
| 3,341,580 A | 9/1967 | Hechenbleikner | 260/541 |
| 3,477,990 A | 11/1969 | Dante et al. | 260/47 |
| 3,634,323 A | 1/1972 | Moran | 260/47 |
| 3,781,379 A | 12/1973 | Theodore et al. | 260/836 |
| 3,974,303 A | 8/1976 | Iwase et al. | 427/54 |
| 4,064,161 A | 12/1977 | Lewis et al. | 526/320 |
| 4,091,048 A | 5/1978 | Labana et al. | 260/836 |
| 4,129,488 A | 12/1978 | McGinniss et al. | 204/159.19 |
| 4,163,810 A | 8/1979 | McGinniss | 427/54 |
| 4,181,642 A | 1/1980 | Holle et al. | 260/37 |
| 4,208,313 A | 6/1980 | Lewis et al. | 260/29.6 R |
| 4,225,650 A | 9/1980 | van Brederode et al. | 428/405 |
| 4,268,542 A | 5/1981 | Sakakibaura et al. | 427/195 |
| 4,444,954 A | 4/1984 | Mels et al. | 525/124 |
| 4,482,721 A | 11/1984 | Wegner et al. | 548/262 |
| 4,939,213 A | 7/1990 | Jacobs, III et al. | 525/329.9 |
| 5,068,305 A | 11/1991 | Meixner et al. | 528/49 |
| 5,084,541 A | 1/1992 | Jacobs, III et al. | 528/45 |
| 5,379,947 A | 1/1995 | Williams et al. | 241/21 |
| 5,418,301 A | 5/1995 | Hult et al. | 525/437 |
| 5,475,073 A | 12/1995 | Guo | 526/333 |
| 5,480,493 A | 1/1996 | Hurry, Jr. | 134/4 |
| 5,484,850 A | 1/1996 | Kempter et al. | 525/286 |
| 5,534,598 A | 7/1996 | Guo | 525/329.2 |
| 5,558,911 A | 9/1996 | Blum | 427/517 |
| 5,639,560 A | 6/1997 | Moens et al. | 428/482 |
| 5,714,264 A * | 2/1998 | Sacharski et al. | 428/413 |
| 5,719,246 A | 2/1998 | Taniguchi et al. | 526/320 |
| 5,817,733 A | 10/1998 | Rink | 528/71 |
| 5,889,106 A | 3/1999 | Kurek et al. | 524/589 |
| 5,981,653 A | 11/1999 | Wilmes et al. | 524/839 |
| 6,106,905 A | 8/2000 | Blum et al. | 427/493 |
| 6,133,337 A | 10/2000 | Blum et al. | 522/104 |
| 6,177,487 B1 | 1/2001 | Sapper et al. | 523/333 |
| 6,187,384 B1 | 2/2001 | Wilke et al. | 427/388.4 |
| 6,232,359 B1 * | 5/2001 | Christian | 522/18 |
| 6,747,091 B1 * | 6/2004 | Baumgart et al. | 524/560 |

FOREIGN PATENT DOCUMENTS

| | | |
|---|---|---|
| CA | 2 102 169 | 11/1993 |
| CA | 2 103 520 | 2/1994 |
| CA | 2 216 111 | 4/1996 |
| DE | 42 03 278 | 8/1993 |
| DE | 196 18 657 A1 | 1/1997 |

(Continued)

OTHER PUBLICATIONS

Basf Lacke +Farben AG, EP 0708 788 B1, Jun. 16, 1993, entitled "Process for the preparation of polyurethane resins and their use and the use of ethoxyethyl propionate for the preparation of polyurethane resins", pp. 1-38.

(Continued)

*Primary Examiner*—Tae H. Yoon

(57) ABSTRACT

The invention relates to a powder-slurry that can be hardened by actinic radiation or by thermal means, comprising (I) components containing functional groups (A) which render them hardenable by actinic radiation and components containing complementary functional groups (B) which render them thermally hardenable, in a weight ratio of 50:1 to 1:50 and/or comprising (II) components containing the functional groups (A) and (B) which render them thermally hardenable and hardenable by actinic radiation in a molar ratio of 100:1 to 1:100.

12 Claims, No Drawings

FOREIGN PATENT DOCUMENTS

| | | |
|---|---|---|
| DE | 19618657 | 1/1997 |
| DE | 196 23 371 | 12/1997 |
| EP | 0 033 896 A1 | 1/1981 |
| EP | 098 655 A1 | 6/1983 |
| EP | 286 594 | 3/1988 |
| EP | 0 299 420 A2 | 7/1988 |
| EP | 0 522 648 B1 | 7/1992 |
| EP | 582 051 | 5/1993 |
| EP | 0 624 577 A1 | 5/1994 |
| EP | 0 636 669 A2 | 7/1994 |
| EP | 0 652 264 A2 | 10/1994 |
| EP | 650 979 | 10/1994 |
| EP | 708 788 | 1/1995 |
| EP | 767 185 | 4/1997 |
| EP | 0 844 286 A1 | 12/1997 |
| EP | 033 896 | 1/1998 |
| EP | WO 98/28345 | 7/1998 |
| GB | 1 338 204 | 11/1973 |
| GB | 2 261 664 A | 5/1993 |
| WO | WO 80/00447 | 3/1980 |
| WO | WO 93/25596 | 12/1993 |
| WO | WO 93/17060 | 5/1995 |
| WO | WO 96/12754 | 5/1996 |
| WO | WO 97/25361 | 7/1997 |

OTHER PUBLICATIONS

English Abstract for DE 19618657.
English Abstract for EP 033 896.
English Abstract for EP 286 594.
English Abstract for EP 650 979.
English Abstract for DE 4203278.
English Abstract for DE 196 23 371.
English Abstract for EP0582051.
English Abstract for WO 98/28345 is on the front page of the International Publication.
Ullmanns Encyclopedia Chemie, 3rd edition, vol. 14, Urban & Schwarzenberg, Munich, Berlin, 1963, pp. 80 to 89 and pp. 99-105.
Römpp Lexikon Lack und Druckfarben, Georg Thieme Verlag, Stuttgart, 1998, pp. 444 to446.
"Lackadditive" by Johan Bielemann, Wiley-VCH, Weinheim, New York, 1998, pp. 31 to 65.

* cited by examiner

POWDER-SLURRY THAT CAN BE HARDENED BY ACTINIC RADIATION OR BY THERMAL MEANS, METHOD FOR PRODUCING SAID SLURRY AND USE OF THE SAME

The present invention relates to a novel powder slurry curable thermally and with actinic radiation. The present invention also relates to a novel process for preparing this powder slurry. The invention relates not least to the use of the novel powder slurry to prepare clearcoat materials for the automotive sector and the industrial sector.

Automobile bodies are nowadays coated preferably using liquid coating materials, i.e., spray paints. These coating materials give rise to numerous environmental problems owing to their solvent content. The same applies to the use of waterborne clearcoat materials, which still contain certain amounts of organic solvents.

Thermally curable waterborne clearcoat materials of this kind are known from the German patent DE-A-196 23 371. Directly after application, the conventional waterborne clearcoat materials do not dry to a powder but instead flow out to form a continuous film. They comprise aqueous secondary dispersions and are used in the automotive sector for aqueous multicoat systems or aqueous one-component or two-component clearcoat materials. The aim here is for sedimentation-stable dispersions having an average particle size of from about 10 to about 200 nm. The reason, familiar to the skilled worker from experience, is that the better the stabilization and the lower the size of dispersion particles, the less their tendency to sedimentation. Reliable application behavior and a reduction in popping tendency, however, necessitate the use of up to 20% by weight of solvents as well.

For this reason, increased efforts have been made in recent years to use powder coating materials for the coating. The results to date, however, have not been satisfactory, owing in particular to the need for increased film thicknesses in order to obtain a uniform appearance.

Further problems of powder coating materials for thermal curing arise from the requirement for blocking resistance on storage, and storability even in summer temperatures. In order to ensure that this requirement is met, the softening point of the coating powders must be high. Because of the high softening point of the coating materials, however, the thermally activated crosslinking reaction begins as early as during the melting of the powders on the substrate, before the film surface has achieved optimum leveling.

To solve this problem, the German patents DE-A-24 36 186 and DE-A-26 47 700, the European patents EP-A-0 098 655, EP-A-0 286 594, EP-A-0 410 242, EP-A-0 522 648, EP-A-0 585 742, EP-A-0 636 669 and EP-A-0 650 979, the International patent application WO 93/25596, and the U.S. Pat. No. 4,064,161, U.S. Pat. No. 4,129,488, U.S. Pat. No. 4,163,810, U.S. Pat. No. 4,208,3130 and U.S. Pat. No. 5,639,560 propose UV-curable powder coating materials in which it is possible to separate the melting operation from the crosslinking. The UV powder coating materials disclosed to date are all based on substances containing acrylic or vinylic unsaturation, which owing to the high melting temperature required for effective blocking resistance may also undergo thermal polymerization prior to UV irradiation. In order to guarantee blocking resistance, the binders employed for the UV powder coating materials must be absolutely solvent-free polymers, which, however, are highly problematic to obtain owing to their tendency to undergo thermal polymerization.

A problem of UV powder coating materials, however, is that they are only of limited suitability for coating three-dimensional objects, since, with such objects, shadow regions occur, in which UV powder coating materials undergo little or no curing. The same applies to UV powder coating materials comprising hiding pigments.

Attempts have been made to solve this problem by means of powder coating materials which are curable thermally and with actinic radiation. A so-called dual-cure powder coating materials of this kind is known from the European patent EP-A-0 844 286. It comprises an unsaturated binder and a second resin copolymerizable therewith, and also a photo-initiator and a thermal initiator, and is therefore curable thermally and with actinic radiation. However, this dual-cure powder coating material is used as a pigmented topcoat material, which is cured superficially with UV light and thermally in the regions close to the substrate. The aforementioned patent does not reveal whether this known powder coating material is also suitable for producing clearcoat films in multicoat systems.

The general problem with the use of powder coating materials, namely that, owing to the different application technology, they cannot be used on existing installations designed for liquid coating materials, is not solved by the dual-cure powder coating material either, however.

This problem was the reason for the development of thermally curable powder coating materials in the form of aqueous dispersions which can be processed using liquid coating technologies. These powder clearcoat dispersions, known to those skilled in the art also as powder slurries or powder clearcoat slurries, and their preparation and application are described in the German patents DE 196 13 547, DE 196 17 086, DE 196 18 657, DE 195 40 977 and DE 195 18 392, the European patent EP-A-0 652 264, the International patent application WO 80/00447, and the U.S. Pat. No. 4,268,542.

Thus, in the process known from the patent U.S. Pat. No. 4,268,542, a powder clearcoat slurry based on acrylic resins is used which is suitable for coating automobiles. In this case, a conventional powder coat is applied first of all to the body, after which the powder coating dispersion is applied as a clearcoat material. In the case of this powder clearcoat slurry, ionic thickeners are used, which lead to relatively high sensitivity of the applied clearcoat film with respect to moisture, especially with respect to condensation. Moreover, it is necessary to operate at high baking temperatures of more than 160° Celsius.

The powder clearcoat slurry known from the European patent EP-A-0 652 264 is prepared by first coextruding the solid binder and crosslinker components and any additives, as normal with the production of powder coating materials, and then subjecting the coextrudate to dry milling, after which it is converted into a powder clearcoat slurry in a further step of wet milling, using emulsifiers and wetting agents.

Unlike the powder clearcoat materials, these powder clearcoat slurries may be processed in conventional wet coating installations and may be applied at substantially lower film thickness of approximately 40 μm as against approximately 80 μm in the case of powder coating materials, with good leveling and with a chemical resistance comparable with that of the powder coating materials.

However, the general problem of thermally activated crosslinking on evaporation of the water and coalescence of the resulting powder covering is still not solved with this technology, since crosslinking begins not at a sharply defined temperature but rather gradually, before the water has fully evaporated and an optimum surface has formed. The water which continues to emerge after the crosslinking reaction has begun, owing to the high temperatures required, is a cause of blisters and craters, furthermore.

It is an object of the present invention to provide a novel powder slurry which no longer has the disadvantages of the prior art. In contrast to the known waterborne clearcoat materials, the novel powder slurries should ensure more reliable application behavior with respect to popping at the required film thicknesses of approximately 40–50 μm. Furthermore, the novel powder slurries should combine the advantages of exposure with actinic radiation with those of thermal curing, without having the disadvantages of these two methods, and should give coatings of high chemical stability.

Accordingly, we have found the novel powder slurry curable thermally and with actinic radiation, comprising (I) constituents containing functional groups (A) which render them curable with actinic radiation, and constituents containing complementary functional groups (B) which render them curable thermally, in a weight ratio of from 50:1 to 1:50.

and/or (II) constituents containing the functional groups (A) and (B) which render them curable thermally and with actinic radiation in a molar ratio of from 100:1 to 1:100.

In the text below, the novel powder slurry curable thermally and with actinic radiation is referred to for the sake of brevity as the "slurry of the invention".

Furthermore, we have found a novel process for preparing a powder slurry curable thermally and with actinic radiation by mixing of its constituents in the melt, milling of the resulting mixture to give solid particles, followed if desired by the wet milling of the solid particles, and dispersion of the solid particles in an aqueous phase, which involves using (I) constituents containing functional groups (A) which render them curable with actinic radiation, and constituents containing complementary functional groups (B) which render them curable thermally, and/or (II) constituents containing the functional groups (A) and (B) which render them curable thermally and with actinic radiation.

Additionally we have found a novel process for preparing a pseudoplastic powder slurry by 1) emulsification of an organic solution comprising
    1.1) thermally curable constituents and
    1.2) constituents curable with actinic radiation and/or
    1.3) constituents curable thermally and with actinic radiation
    to give an emulsion of the oil-in-water type,
2) removal of the organic solvent or the organic solvents, and
3) partial or complete replacement of the solvent volume removed by water, to give a powder slurry comprising solid spherical particles, wherein the powder slurry is further admixed with 4) at least one ionic, especially anionic, thickener and at least one nonionic associative thickener.

The technical advantages of the slurry of the invention lie in the ability to combine the known advantages of the thermally curable powder slurries—especially that of spray application—with those of UV powder coating materials—especially the separation of the melting process from the crosslinking. It has surprisingly been found that, if the coalesced film has a low residual water content, UV curing is particularly rapid and complete. The natural equilibrium between the water content of the film and the ambient air, which is dependent on the hydrophilicity of the crosslinking paint films, is established rapidly even while the system is still cooling.

The slurry of the invention is curable with actinic radiation. In the context of the present invention, actinic radiation means electron beams or UV radiation, especially UV radiation.

The slurry of the invention contains functional groups (A) which render it curable with actinic radiation and functional groups (B) which render it curable thermally.

The functional groups (A) and (B) may be present in one and the same constituent, which in that case is curable both with actinic radiation and thermally. In that case they are present in particular in a molar ratio of from 100:1 to 1:100, preferably from 80:1 to 1:80, with particular preference from 60:1 to 1:60, with very particular preference from 40:1 to 1:40, and most preferably from 20:1 to 1:20.

Alternatively, the functional groups (A) and (B) may be present in different constituents, so that the slurry of the invention comprises at least one constituent which on the basis of its functional groups (A) is curable with actinic radiation and at least one constituent which on the basis of its complementary functional groups (B) is curable thermally. In accordance with the invention it is of advantage if the constituent curable with actinic light and the constituent curable thermally are present in a weight ratio of from 50:1 to 1:50, preferably from 40:1 to 1:40, with particular preference from 30:1 to 1:30, with very particular preference from 20:1 to 1:20, and in particular from 10:1 to 1:10.

In accordance with the invention it is of advantage in this context if the constituent curable with actinic radiation also contains functional groups (B) which in that case link the network formed by radiation curing more closely with the network which forms as a result of the thermal crosslinking.

The constituents curable thermally and/or with actinic radiation themselves have different functions within the powder slurry of the invention. For instance, they may be binders, crosslinking agents, reactive diluents, or additives.

In accordance with the invention it is of advantage if the thermally curable constituents comprise binders and crosslinking agents and also, if desired, reactive diluents, and the constituents curable with actinic radiation comprise binders and additives and also, if desired, reactive diluents.

The constituents curable thermally and/or with actinic radiation may be present in the solid particles and/or in the aqueous phase of the powder slurry of the invention.

Accordingly, the powder slurry of the invention may comprise solid particles which are curable thermally and with actinic radiation. However, the powder slurry of the invention may also comprise solid particles which are only curable thermally and solid particles which are only curable with actinic radiation. In this system, the aqueous phase may additionally comprise further constituents, preferably in the form of a dispersion and/or emulsion, which are likewise curable thermally and/or with actinic radiation.

In a further variant, the powder slurry of the invention may comprise solid particles which are exclusively curable thermally. In this case, the aqueous phase must additionally comprise further constituents, preferably in the form of a dispersion and/or emulsion, which are curable with actinic radiation.

In yet another variant, the powder slurry of the invention may comprise solid particles which are exclusively curable with actinic radiation. In this case, the aqueous phase must additionally comprise further constituents, preferably in the form of a dispersion and/or emulsion, which are curable thermally.

In the case of the last-mentioned variants, it should be ensured that the solid particles of the powder slurry of the invention are not attacked by the added dispersions and/or emulsions that are curable thermally and/or with actinic radiation; if they are, the slurry properties may be lost.

In accordance with the invention it is of advantage if the constituents curable thermally and/or with actinic radiation are present in the solid particles of the powder slurry of the invention. Further particular advantages arise if constituents curable thermally and with actinic radiation are present in the solid particles.

The functional groups (A) which imbue the constituents with radiation-curable properties comprise, in particular, ethylenically unsaturated groups (A) or groups (A) which are capable of photochemical hydrogen abstraction. Examples of suitable ethylenically unsaturated groups (A) are (meth)acrylate, vinyl ether, vinyl ester, allyl or vinylaromatic groups. An example of a suitable group (A) capable of photochemical hydrogen abstraction is the dihydrodicyclopentadienol group. In accordance with the invention, the acrylate groups are of advantage, and are therefore used with particular preference.

Complementary functional groups (B) which permit the thermal crosslinking may be present in the binders alone. If so, the binders are self-crosslinking. In accordance with the invention it is of advantage if the complementary functional groups (B) are present in the binders and the crosslinking agents. Examples of suitable complementary functional groups (B) are given in the following overview. In the overview, the variable R represents an acyclic or cyclic aliphatic, an aromatic and/or an aromatic-aliphatic (araliphatic) radical; the variables $R^1$ and $R^2$ represent identical or different aliphatic radicals or are linked with one another to form an aliphatic or heteroaliphatic ring.

Overview:
Examples of complementary functional groups in

| Binder | and or | crosslinking agent |
|---|---|---|
| Crosslinking agent | and | binder |
| —SH | | —C(O)—OH |
| —NH$_2$ | | —C(O)—O—C(O)— |
| —OH | | —NCO |
| | | —NH—C(O)—OR |
| | | —CH$_2$—OH |
| | | =CH$_2$—O—CH$_3$ |
| | | —NH—C(O)—CH(—C(O)OR)$_2$ |
| | | —NH—C(O)—CH(—C(O)OR)(—C(O)—R) |
| | | —NH—C(O)—NR'R$_2$ |
| | | =Si(OR)$_2$ |
| | | 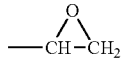 |
| —C(O)—OH | | 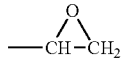 |
| —O—C(O)—CR=CH$_2$ | | —OH |
| —O—CR=CH$_2$ | | —NH$_2$ |
| | | —C(O)—CH$_2$—C(O)—R |
| | | —CH=CH$_2$ |

In accordance with the invention, carboxyl groups and epoxide groups are employed with very particular preference as complementary groups (B). In this case it is particularly advantageous if the carboxyl groups are present in the crosslinking agents and the epoxide groups in the binders.

Suitable thermally curable constituents for the construction of the slurry of the invention are as used also in the customary and known powder slurries described in German patents DE 196 13 547, DE 196 17 086, DE 196 18 657, DE 195 40 977 and DE 195 18 392, the European patent EP-A-0 652 264, the International patent application WO 80/00447, and the U.S. Pat. No. 4,268,542.

In one advantageous embodiment of the slurry of the invention, the thermally curable constituents used in the solid particles comprise hydroxyl-containing binders, especially the polymeric reactive diluents described below, and the conventional crosslinking agents described below, and also, if desired, the tris(alkoxycarbonylamino)triazines described below.

In a further advantageous embodiment of the slurry of the invention, the thermally curable constituents present in the solid particles comprise (1) at least one epoxy-containing binder containing from 0.5 to 40% by weight, based on the binder, of copolymerized glycidyl-containing monomers, and (2) at least one tris(alkoxycarbonylamino)triazine and at least one polycarboxylic acid, especially a straight-chain dicarboxylic acid, and/or a carboxy-functional polyester as crosslinking agents or alternatively (1) at least one tris(alkoxycarbonylamino)triazine and at least one oligomeric or polymeric, epoxy-containing crosslinking agent containing from 0.5 to 40% by weight, based on the crosslinking agent, of copolymerized glycidyl-containing monomers, and/or a low molecular mass, epoxy-containing crosslinking agent, and (2) at least one carboxyl-containing polymer as binder.

Examples of suitable epoxy-functional binders (1) are polyacrylate resins containing epoxide groups, which are preparable by copolymerizing at least one ethylenically unsaturated monomer containing at least one epoxide group in the molecule with at least one further ethylenically unsaturated monomer which contains no epoxide group in the molecule, at least one of the monomers being an ester of acrylic acid or methacrylic acid. Epoxy-containing polyacrylate resins of this kind are known, for example, from the patents EP-A-0 299 420, DE-B-22 14 650, DE-B-27 49 576, U.S. Pat. No. 4,091,048 and U.S. Pat. No. 3,781,379.

Examples of suitable monomers which contain no epoxide group in the molecule are alkyl esters of acrylic and methacrylic acid, especially methyl acrylate, methyl methacrylate, ethyl acrylate, ethyl methacrylate, n-butyl acrylate, n-butyl methacrylate, secondary-butyl acrylate, secondary-butyl methacrylate, tert-butyl acrylate, tert-butyl methacrylate, neopentyl acrylate, neopentyl methacrylate, 2-ethylhexyl acrylate or 2-ethylhexyl methacrylate; amides of acrylic acid and methacrylic acid, especially acrylamide and methacrylamide; vinylaromatic compounds, especially styrene, methylstyrene or vinyltoluene; the nitriles of acrylic acid and methacrylic acid; vinyl and vinylidene halides, especially vinyl chloride or vinylidene fluoride; vinyl esters, especially vinyl acetate and vinyl propionate; vinyl ethers, especially n-butyl vinyl ether; or hydroxyl-containing monomers, especially hydroxyethyl acrylate, hydroxyethyl methacrylate, hydroxypropyl acrylate, hydroxypropyl methacrylate, 4-hydroxybutyl acrylate or 4-hydroxybutyl methacrylate.

Examples of suitable epoxy-functional monomers are glycidyl acrylate, glycidyl methacrylate or allyl glycidyl ether.

The epoxy-containing polyacrylate resin (1) normally has an epoxide equivalent weight of from 400 to 2500, preferably from 420 to 700, a number average molecular weight Mn (determined by gel permeation chromatography using a polystyrene standard) of from 2000 to 20 000, preferably from 3000 to 10 000, and a glass transition temperature Tg of from 30 to 80, preferably from 40 to 70, with particular preference from 40 to 60, and in particular from 48 to 52° C. (measured by means of differential scanning calorimetry (DSC)).

The preparation of the epoxy-containing polyacrylate resin (1) has no special features but instead takes place in accordance with the customary and known polymerization methods.

The further essentially thermally curable constituent is the crosslinking agent (1) or (2).

In the embodiment in question, at least two different crosslinking agents (1) or (2) are employed.

In this context, the first crosslinking agent (2) comprises tris(alkoxycarbonylamino)triazines and their derivatives. Examples of suitable tris(alkoxycarbonylamino)triazines are described in the patents U.S. Pat. No. 4,939,213, U.S. Pat. No. 5,084,541 and EP-A-0 624 577. In particular, the tris(methoxy-, tris(butoxy- and/or tris(2-ethylhexoxycarbonylamino)triazines are used.

Preference is given to the methyl butyl mixed esters, the butyl 2-ethylhexyl mixed esters, and the butyl esters. These have the advantage over the simple methyl ester of improved solubility in polymer melts.

The tris(alkoxycarbonylamino)triazines and their derivatives may also be used in a mixture with conventional crosslinking agents. Examples of suitable conventional crosslinking agents are etherified melamine-formaldehyde resins, benzoguanamine resins, compounds or resins containing anhydride groups, compounds or resins containing epoxide groups, blocked and/or unblocked polyisocyanates, beta-hydroxy-alkylamides such as N,N,N',N'-tetrakis(2-hydroxyethyl)-adipamide or N,N,N',N'-tetrakis(2-hydroxypropyl)-adipamide, with compounds containing on average at least two groups capable of transesterification, examples being reaction products of malonic diester and polyisocyanates or of esters and partial esters of polyhydric alcohols of malonic acid with mono-isocyanates, as described in the European patent EP-A-0 596 460.

Crosslinking agents of this kind are well known to the skilled worker and are offered by numerous companies as commercial products.

The additional use of blocked polyisocyanates has proven advantageous. Examples of suitable blocked polyisocyanates are described in the German patents DE-A-196 17 086 and 196 13 269, in the European patents EP-A-0 004 571 and 0 582 051, and in the U.S. Pat. No. 4,444,954.

The second crosslinking agent (2) comprises carboxylic acids, especially saturated, straight-chain, aliphatic dicarboxylic acids having 3 to 20 carbon atoms in the molecule. Instead of or in addition to them it is also possible to use carboxy-functional polyesters. Very particular preference is given to the use of dodecane-1,12-dicarboxylic acid.

In order to modify the properties of the slurries and powder coating materials of the invention, it is possible to use minor amounts of other carboxyl-containing crosslinking agents. Examples of suitable additional crosslinking agents of this kind are saturated branched or unsaturated straight-chain dicarboxylic and polycarboxylic acids and also the carboxyl-containing polymers described in detail below as binders (2).

In the second variant of the particularly advantageous embodiment, the powder slurries of the invention may comprise in a second variant an epoxy-functional crosslinking agent (1) and a carboxyl-containing binder (2).

Examples of suitable carboxyl-containing binders (2) are for example polyacrylate resins prepared by copolymerizing at least one ethylenically unsaturated monomer containing at least one acid group in the molecule with at least one further ethylenically unsaturated monomer containing no acid groups in the molecule.

Examples of highly suitable carboxyl-containing binders (2) are the polyacrylates and polymethacrylates described below, containing >0% by weight of copolymerized acrylic acid and/or methacrylic acid.

Examples of suitable oligomeric and polymeric, epoxy-functional crosslinking agents (1) are the epoxy-containing binders (1) described above.

Examples of suitable low molecular mass, epoxy-functional crosslinking agents (1) for use in accordance with the invention are low molecular mass compounds containing at least two glycidyl groups, especially pentaerythritol tetraglycidyl ether or triglycidyl isocyanurate.

The epoxy-containing binder (1) and the carboxyl-containing crosslinking agent (2) of the first variant, and, respectively, the carboxyl-containing binder (2) and the epoxy-functional crosslinking agent (1) of the second variant of the particularly preferred embodiment, are used generally in a ratio such that there are from 0.5 to 1.5, preferably from 0.75 to 1.25, equivalents of carboxyl groups per equivalent of epoxide groups. The amount of carboxyl groups present may easily be determined by titration with an alcoholic KOH solution.

In accordance with the invention, the epoxy-functional binder (1) or the oligomeric or polymeric, epoxy-functional crosslinking agent (1) contains vinylaromatic compounds such as styrene in copolymerized form. In order to limit the risk of cracking on weathering, however, the amount is not more than 35% by weight, based on the binder (1) or the crosslinking agent (1). Preference is given to copolymerizing from 10 to 25% by weight.

The slurry of the invention comprises constituents which are curable with actinic radiation, especially UV radiation. Suitable binders are all those radiation-curable, low molecular mass, oligomeric and/or polymeric compounds, preferably radiation-curable binders, that are known from the UV coatings field, especially those based on ethylenically unsaturated prepolymers and/or ethylenically unsaturated oligomers, reactive diluents if desired, and also one or more photoinitiators, if desired. Examples of suitable radiation-curable binders are (meth)acryloyl-functional (meth)acrylic copolymers, polyether acrylates, polyester acrylates, unsaturated polyesters, epoxy acrylates, urethane acrylates, amino acrylates, melamine acrylates, silicone acrylates, and the corresponding methacrylates. It is preferred to use binders which are free from aromatic structural units.

It is important that they do not lower the glass transition temperature Tg of the particles of the slurry of the invention to such an extent that there is a risk of its coalescing.

Particular suitability is possessed by acrylic resins containing pendant functional groups, such as epoxide groups or hydroxyl groups, for example, having molecular weights in the range from Mn 1000 to 10 000 with molecular weight distributions <4, as described, for example, in DE-A-42 03 278, which are subsequently reacted with acrylic acid or acrylic acid derivatives, such as acryloyl chloride, to give the corresponding acrylated acrylates (EP-A-0 650 979).

Suitable epoxy-functional precursors for the acrylated acrylates curable with actinic radiation are, for example, polyacrylate resins containing epoxide groups, which are preparable by copolymerizing at least one ethylenically unsaturated monomer which contains at least one epoxide group in the molecule with at least one further ethylenically unsaturated monomer which contains no epoxide group in the molecule, at least one of the monomers being an ester of acrylic acid or methacrylic acid. Polyacrylate resins of this kind, containing epoxide groups, are known, for example, from the patents EP-A-299 420, DE-B-22 14 650, DE-B-27 49 576, U.S. Pat. No. 4,091,048, and U.S. Pat. No. 3,781, 379.

Examples of ethylenically unsaturated monomers which contain no epoxy group in the molecule are alkyl esters of acrylic and methacrylic acid containing 1 to 20 carbon atoms in the alkyl radical, especially methyl acrylate, methyl methacrylate, ethyl acrylate, ethyl methacrylate, butyl acrylate, butyl methacrylate, 2-ethylhexyl acrylate and 2-ethyhexyl methacrylate. Further examples of ethylenically unsaturated monomers which contain no epoxy groups in the molecule are acid amides, such as acrylamide and methacrylamide, for example, maleamide, vinylaromatic compounds, such as styrene, methylstyrene and vinyltoluene, nitriles, such as acrylonitrile and methacrylonitrile, vinyl and vinylidene halides, such as vinyl chloride and vinylidene fluoride, vinyl esters, such as vinyl acetate, for example, and hydroxyl-containing monomers, such as hydroxyethyl acrylate and hydroxyethyl methacrylate, for example.

The epoxy-functional monomers used in the epoxy-functional binders are preferably glycidyl acrylate, glycidyl methacrylate, allyl esters and allyl glycidyl ether.

The epoxy-containing polyacrylate resin usually has an epoxide equivalent weight of from 400 to 2500, preferably from 420 to 700, a number average molecular weight (determined by gel permeation chromatography using a polystyrene standard) at from 2000 to 20 000, preferably from 1000 to 10 000, and a glass transition temperature Tg of from 30 to 80, preferably from 40 to 70, with particular preference from 40 to 60° C. (measured by means of differential scanning calorimetry (DSC)). Very particular preference is given to approximately 50° C. The molecular weight distributions are preferably below 6, with particular preference below 3. Examples of suitable acrylic resins are those described in the German patent DE-A-42 03 278. Mixtures of two or more acrylic resins may also be employed.

The epoxy-containing polyacrylate resin may be prepared by addition polymerization in accordance with methods which are well and widely known.

In addition, the functional resins may also comprise aromatic compounds. Their proportion should be below 30%, preferably below 20%. These compounds may, for example, comprise vinylaromatic compounds. One example thereof is styrene.

It is possible, furthermore, to use the following:
Unsaturated polymers of a wide variety of types, containing from 0.5 to 3.5 double bonds for a molecular weight of 1000 daltons, which are obtained by polymer-analogous reaction of polymers with unsaturated substances (DE-A-24 36 186).

Polymethacrylates having a low molecular weight of from 500 to 25 000 daltons and a narrow distribution, obtained by anionic polymerization and functionalized by polymer-analogous reaction with double bonds (U.S. Pat. No. 4,064,161).

Blends of solid epoxy acrylates, as obtainable by reacting diepoxy resins with acrylic acid, and partially crystalline solid polyester acrylates, as obtainable from carboxyl-terminated polyester by reaction with glycidyl acrylates (U.S. Pat. No. 4,129,488).

Unsaturated polyurethane acrylates with a melting range from 50 to 180° C. (EP-A-0 410 242).

Blends of unsaturated polyurethane acrylates with unsaturated crystalline polyesters, for improving the blocking resistance (EP-A-0 585 742).

Blends of unsaturated polyesters or polyacrylates with polyurethane vinyl ethers (EP-A-0 636 669).

Functional polyacrylates of olefinically unsaturated monomers, by reaction of functionally complementary polyacrylates (EP-A-0 650 978).

An embodiment of EP-A-0 650 978, the base polymers being prepared in a high-temperature polymerization.

Polyacrylates free of double bonds, which can be crosslinked by way of hydrogen transfer to photo-chemically excited, copolymeric photo-initiators of the Norrish II type (DE-A-44 13 436).

Polyacrylates free of double bonds and containing dihydrodicyclopentadienol acrylate, which can be crosslinked by way of hydrogen transfer to photo-chemically excited, copolymeric photoinitiators of the Norrish II type (DE-A-e196 00 147).

Further suitable examples of constituents curable with actinic radiation are disclosed in international patent applications PCT/EP 96/05769:
Crosslinked polymeric compounds containing at least one ethylenic double bond, in a mixture with organic compounds containing at least one hydrogen atom having a bond energy of max. 397 Kg/mol; or PCT/EP 97/07074:
Radiation-crosslinkable acrylic polymers preparable by polymer analogous reaction of polyacrylates with substances introducing a group which forms free radicals with actinic radiation.

The slurry of the invention comprises at least one of the constituents described above.

The photoinitiators required for UV crosslinking are generally already present in the binders described above and are in general selected from the compounds known from the prior art. Use is made in particular of photoinitiators of the Norrish II type. Photoinitiators of this kind are customary and known. Their mechanism of action is based on an intramolecular variant of the hydrogen abstraction reactions as occur diversely in the case of photochemical reactions. By way of example, reference may be made here to Römpp Chemie Lexikon, 9th, expanded and revised edition, Georg Thieme Verlag, Stuttgart, Vol. 4, 1991.

One example of a suitable photoinitiator of this kind is 4-hydroxybenzophenone. However, it is also possible to use photoinitiators for the cationic polymerization. By way of example, reference may be made here to Römpp Lexikon Lacke und Druckfarben, Georg Thieme Verlag, Stuttgart, 1998, pages 444 to 446.

Polymers according to DE-A-44 13 436 and DE-A-196 00 147 are UV curable without added photoinitiators. Particularly well-crosslinked films are produced by mixtures of unsaturated polymers and polymers according to DE-A-44

13 436 and DE-A-196 00 147 with a particularly high fraction of photochemically excitable, copolymeric photoinitiators of the Norrish II type.

In accordance with the invention it is of advantage if the above-described constituents are present predominantly or exclusively in the solid particles.

In particular, the solid particles of the slurry of the invention may further comprise at least one thermally curable reactive diluent and/or at least one reactive diluent curable with actinic radiation.

Suitable thermally curable reactive diluents include all low molecular mass compounds, oligomers and polymers which have at least two, preferably at least three primary and/or secondary hydroxyl groups and do not destroy the solid state of the powder coating material of the invention and of the slurry of the invention.

Examples of suitable oligomeric and polymeric, thermally curable reactive diluents are linear and/or branched and/or block, comb and/or random poly(meth)acrylates, polyesters, polyurethanes, acrylated polyurethanes, acrylated polyesters, polylactones, polycarbonates, polyethers, (meth)acrylatediols, polyureas or oligomeric polyols.

If these oligomers and polymers are used as thermally curable reactive diluents, they preferably contain no carboxyl groups.

These oligomers and polymers are known to the skilled worker, and numerous suitable compounds are available on the market.

Of these oligomeric and polymeric, thermally curable reactive diluents, the polyacrylates, the polyesters and/or the acrylated polyurethanes are of advantage and are therefore used with preference.

Examples of particularly preferred oligomeric and polymeric thermally curable reactive diluents are 1. Polyacrylates having a hydroxyl number of from 40 to 240, preferably from 60 to 210, in particular from 100 to 200, an acid number of from 0 to 35, glass transition temperatures of from −35 to +85° C. and number average molecular weights $M_n$ of from 1500 to 300 000.

The glass transition temperature of the polyacrylates is determined, as is known, by the nature and amount of the monomers used. The selection of the monomers may be made by the skilled worker with the assistance of the following formula I, in accordance with which the glass transition temperatures may be calculated approximately.

$$1/Tg = \sum_{n=1}^{n=x} W_n/Tg_n; \sum_n W_n = 1 \qquad (I)$$

Tg=Glass transition temperature of the polyacrylate resin
$W_n$=Weight fraction of the n-th monomer
$Tg_n$=Glass transition temperature of the homopolymer of the n-th monomer
x=Number of different monomers.

Measures to control the molecular weight (e.g., selection of appropriate polymerization initiators, use of chain transfer agents or of specific techniques of polymerization, etc.) are part of the art and need not be illustrated further here.

1.1 Particularly preferred polyacrylates are preparable by polymerizing (a1) from 10 to 92, preferably from 20 to 60% by weight of an alkyl or cycloalkyl methacrylate having 1 to 18, preferably 4 to 13 carbon atoms in the alkyl or cycloalkyl radical, or mixtures of such monomers, (a2) from 8 to 60, preferably from 12.5 to 50.0% by weight of a hydroxyalkyl acrylate or a hydroxyalkyl methacrylate having 2 to 4 carbon atoms in the hydroxyalkyl radical, or mixtures of such monomers, (a3) from 0 to 5, preferably from 0.7 to 3% by weight of acrylic acid or methacrylic acid or mixtures of these monomers, and (a4) from 0 to 50, preferably up to 30% by weight, of ethylenically unsaturated monomers different than but copolymerizable with (a1), (a2) and (a3), or mixtures of such monomers, to give polyacrylates of the specification stated above.

Examples of suitable (a1) components are methyl, ethyl, propyl, n-butyl, isobutyl, tert-butyl, pentyl, hexyl, heptyl or 2-ethylhexyl acrylate or methacrylate and also cyclohexyl, tert-butylcyclohexyl or isobornyl acrylate or methacrylate.

Examples of suitable (a2) components are hydroxyethyl, hydroxypropyl or hydroxybutyl or hydroxymethylcyclohexyl acrylate or methacrylate or adducts of (meth)acrylic acid and epoxides, such as Versatic acid$^R$ glycidyl esters.

Examples of suitable (a4) components are vinylaromatic such as styrene, vinyltoluene, alpha-methylstyrene, alpha-ethylstyrene, ring-substituted diethylstyrenes, isoproylstyrene, butylstyrene and methoxystyrenes; vinyl ethers such as ethyl vinyl ether, n-propyl vinyl ether, isoproyl vinyl ether, n-butyl vinyl ether or isobutyl vinyl ether; vinyl esters such as vinyl acetate, vinyl propionate, vinyl butyrate, vinyl pivalate or the vinyl ester of 2-methyl-2-ethylheptanoic acid; or allyl ethers such as trimethylolpropane monoallyl, diallyl or triallyl ether, or ethoxylated or propoxylated allyl alcohol.

1.2 Further examples of particularly preferred polyacrylates are described in the European patent application EP-A-0 767 185 and in the American patents U.S. Pat. Nos. 5,480,493, 5,475,073 or 5,534,598.

1.3 Further examples of particularly preferred polyacrylates are sold under the brand name Joncryl$^R$, such as, for instance, Joncryl$^R$ SCX 912 and 922.5.

1.4 Further examples of particularly preferred polyacrylates are those obtainable by polymerizing (a1) from 10 to 51% by weight, preferably from 25 to 41% by weight, of 4-hydroxy-n-butyl acrylate or methacrylate or a mixture thereof, but especially 4-hydroxy-n-butyl acrylate, (a2) from 0 to 36% by weight, preferably from 0.1 to 20% by weight, of a non-(a1) hydroxyl-containing ester of acrylic acid or of methacrylic acid, or a mixture thereof, (a3) from 28 to 85% by weight, preferably from 40 to 70% by weight, of a non-(a1) or -(a2) aliphatic or cycloaliphatic ester of methacrylic acid having at least 4 carbon atoms in the alcohol residue, or a mixture of such monomers, (a4) from 0 to 3% by weight, preferably from 0.1 to 2% by weight, of an ethylenically unsaturated carboxylic acid or a mixture of such acids, and (a5) from 0 to 20% by weight, preferably from 5 to 15% by weight, of a non-(a1), -(a3) or -(a4) unsaturated monomer, or a mixture of such monomers, to give a polyacrylate having a hydroxyl number of from 60 to 200, preferably from 100 to 160, an acid number of from 0 to 35, and a number average molecular weight $M_n$ of from 1500 to 10 000, the composition of component (a3) being chosen such that polymerization of this component (a3) alone gives a polymethacrylate having a glass transition temperature of from +10 to +100° C., preferably from +20 to +60° C.

Examples of suitable components (a2) are hydroxyalkyl esters of acrylic acid and methacrylic acid such as hydroxyethyl or hydroxypropyl acrylate or methacrylate, the choice being made such that polymerization of this component (a2) alone gives a polyacrylate having a glass transition temperature of from 0 to +80° C., preferably from +20 to +60° C.

Examples of suitable components (a3) are aliphatic esters of methacrylic acid having from 4 to 20 carbon atoms in the alcohol residue, such as n-butyl, isobutyl, tert-butyl, 2-ethylhexyl, stearyl and lauryl methacrylate; or cycloaliphatic esters of methacrylic acid, such as cyclohexyl methacrylate.

Examples of suitable components (a4) are acrylic acid and/or methacrylic acid.

Examples of suitable components (a5) are vinylaromatic hydrocarbons such as styrene, alpha-alkylstyrene or vinyltoluene; amides of acrylic acid and methacrylic acid such as methacrylamide and acrylamide; nitriles of acrylic acid and methacrylic acid; vinyl ethers or vinyl esters, the composition of this component (a5) preferably being so accurate [sic] that polymerization of components (a5) alone results in a polyacrylate having a glass transition temperature of from +70 to +120° C., in particular from +80 to +100° C.

1.5 The preparation of these polyacrylates is widely known and is described, for example, in the standard work Houben-Weyl, Methoden der organischen Chemie, 4th edition, Volume 14/1, pages 24 to 255, 1961.

2. Polyester resins which are preparable by reacting (b1) at least one cycloaliphatic or aliphatic polycarboxylic acid, (b2) at least one aliphatic or cycloaliphatic polyol containing more than two hydroxyl groups in the molecule, (b3) at least one aliphatic or cycloaliphatic diol, and (b4) at least one aliphatic, linear or branched saturated monocarboxylic acid, in a molar ratio of (b1):(b2):(b3):(b4)= 1.0:0.2 to 1.3:0.0 to 1.1:0.0 to 1.4, preferably 1.0:0.5 to 1.2:0.0 to 0.6:0.2 to 0.9, to give a polyester or alkyd resin.

Examples of suitable components (b1) are hexahydrophthalic acid, 1,4-cyclohexanedicarboxylic acid, endomethylenetetrahydrophthalic acid, oxalic acid, malonic acid, succinic acid, glutaric acid, adipic acid, pimelic acid, suberic acid, azelaic acid or sebacic acid.

Examples of suitable components (b2) are pentaerythritol, trimethylolpropane, triethylol-ethane and glycerol.

Examples of suitable components (b3) are ethylene glycol, diethylene glycol, propylene glycol, neopentyl glycol, 2-methyl-2-propyl-1,3-propanediol, 2-methyl-2-butyl-1,3-propanediol, 2,2,4-trimethyl-1,5-pentanediol, 2,2,5-trimethyl-1,6-hexanediol, neopentyl glycol hydroxypivalate or dimethylolcyclohexane.

Examples of suitable components (b4) are 2-ethylenehexanoic acid, lauric acid, isooctanoic acid, isononanoic acid or monocarboxylic acid mixtures obtained from coconut oil or palm kernel oil.

The preparation of the polyesters and alkyd resins used with preference in accordance with the invention is widely known and is described, for example, in the standard work Ullmanns Encyklopädie der technischen Chemie, 3rd edition, Volume 14, Urban & Schwarzenberg, Munich, Berlin, 1963, pages 80 to 89 and pages 99 to 105, and also in the following books: "Resin Alkyd Polyesters" by J. Bourry, Paris, Dunod, 1952, "Alkyd Resins" by C. R. Martens, Reinhold Publishing Corporation, New York, 1961, and "Alkyd Resin Technology" by T. C. Patton, Interscience Publishers, 1962.

1. Polyurethanes as described in the patents EP-A-0 708 788, DE-A-44 01 544 or DE-A-195 34 361.

Further examples of suitable thermally curable reactive diluents are oligomeric polyols which are obtainable by hydroformylation and subsequent hydrogenation from oligomeric intermediates obtained by metathesis reactions of acyclic monoolefins and cyclic monoolefins; examples of suitable cyclic monoolefins are cyclobutene, cyclopentene, cyclohexene, cyclooctene, cycloheptene, norbornene or 7-oxanorbornene; examples of suitable acyclic monoolefins are present in hydrocarbon mixtures which are obtained in petroleum processing by cracking ($C_5$ cut); examples of suitable oligomeric polyols for use in accordance with the invention have a hydroxyl number (OHN) of from 200 to 450, a number average molecular weight Mn of from 400 to 1000, and a mass average molecular weight MW from 600 to 1100;

Further examples of suitable thermally curable reactive diluents are branched, cyclic and/or acyclic $C_9$–$C_{16}$ alkanes functionalized with at least two hydroxyl groups, especially diethyloctanediols, and also cyclohexanedimethanol, neopentyl glycol hydroxy-pivalate, neopentyl glycol, trimethylolpropane or pentaerythritol.

Further examples of suitable thermally curable reactive diluents are hyperbranched compounds containing a tetrafunctional central group, derived from ditrimethylolpropane, diglycerol, ditrimethylolethane, pentaerythritol, tetrakis(2-hydroxyethyl)methane, tetrakis(3-hydroxypropyl)methane or 2,2-bishydroxy-methyl-1,4-butanediol (homopentaerythritol). These reactive diluents may be prepared by the customary and known methods of preparing hyperbranched and dendrimeric compounds. Suitable synthesis methods are described, for example, in the patents WO 93/17060 and WO 96/12754 or in the book by G. R. Newkome, C. N. Moorefield and F. Vögtle, "Dendritic Molecules, Concepts, Syntheses, Perspectives", VCH, Weinheim, N.Y., 1996.

Suitable radiation-curable reactive diluents include low molecular mass polyfunctional ethylenically unsaturated compounds. Examples of suitable compounds of this kind are esters of acrylic acid with polyols, such as neopentyl glycol diacrylate, trimethylolpropane triacrylate, pentaerythritol triacrylate or pentaerythritol tetraacrylate; or reaction products of hydroxylalkyl acrylates with polyisocyanates, especially aliphatic polyisocyanates.

Of the above-described thermally curable reactive diluents for use in accordance with the invention, the carboxyl-free polyacrylates and polymethacrylates which are described above in section 1.1 are of very particular advantage and are therefore used with very particular preference.

The solid particles of the slurry of the invention may comprise one or more suitable catalysts for curing the epoxy resins. Examples of suitable catalysts are phosphonium salts and tetraalkylammonium salts of organic and inorganic acids, amines, imidazole and imidazole derivatives. The catalysts are used in general in amounts of from 0.001 to 2% by weight, based on the overall weight of the constituents containing epoxide groups, and also of the constituents containing carboxyl groups.

Examples of suitable phosphonium salts are ethyltriphenylphosphonium iodide, ethyltriphenylphosphonium chloride, ethyltriphenylphosphonium thio-cyanate, ethyltriphenylphosphonium acetate-acetic acid complex, tetrabutylphosphonium iodide, tetrabutylphosphonium bromide or tetrabutylphosphonium acetate-acetic acid complex. These and other suitable phosphonium catalysts are described, for example, in the patents U.S. Pat. No. 3,477,990 and U.S. Pat. No. 3,341,580.

Examples of suitable tetraalkylammonium salts are cetyltrimethylammonium and dicetyldimethylammonium bromide.

Examples of suitable imidazole catalysts are 2-styrylimidazole, 1-benzyl-2-methylimidazole, 2-methylimidazole and 2-butylimidazole. These and further suitable imidazole catalysts are described in the Belgian patent No. 756,693.

In addition to the essential constituents described above, the solid particles of the slurry of the invention may comprise additives as commonly used in clearcoat materials. It is essential here that these additives do not substantially lower the glass transition temperature Tg of the binders.

Examples of suitable additives are crosslinking catalysts, defoamers, adhesion promoters, additives for improving the substrate wetting, additives for improving the surface smoothness, flatting agents, light stabilizers, preferably UV absorbers such as hydroxyphenyltriazines or HALS such as bis(1-alkyloxy-2,2,6,6-tetramethyl-4-piperidyl) sebacates, corrosion inhibitors, biocides, flame retardants or polymerization inhibitors, as described in detail in the book "Lackadditive" [Additives for coatings] by Johan Bielemann, Wiley-VCH, Weinheim, N.Y., 1998.

In the slurry of the invention, especially in its solid particles, the ratio of thermally crosslinkable constituents to constituents crosslinkable with actinic radiation may vary widely, preferably within the limits indicated above. The ratio is guided primarily by whether the slurry of the invention is intended to be curable primarily thermally or primarily with actinic radiation, and also by the intended use of the slurry of the invention. For instance, a slurry of the invention which is curable primarily with actinic radiation will be prepared if the intention is to coat substrates whose capacity to withstand thermal stress is low. In each individual case, therefore, the skilled worker is able to determine the appropriate ratio on the basis of his or her knowledge in the art, possibly with the assistance of simple preliminary tests.

Based on its total amount, the slurry of the invention comprises the solid particles in an amount of from 5 to 80, preferably from 10 to 70, with particular preference from 15 to 60, and in particular from 20 to 50% by weight.

The preparation of the solid particles of the invention has no special features in terms of process but instead takes place in accordance with the known methods, as described, for example, in the BASF Lacke+Farben AG product information "Pulverlacke" [Powder coatings], 1990, by homogenizing and dispersing using, for example, an extruder or screw compounder. Following their preparation, the solid particles or powder coating materials of the invention are prepared for dispersion by milling and, if desired, by sieving and classifying.

To prepare the dispersion, i.e., slurry of the invention, the solid particles are dispersed in an aqueous phase. Accordingly, the continuous phase is preferably water. The aqueous phase may comprise further constituents by means of which the solid particles are dispersed and the slurry of the invention stabilized. The requisite performance properties may be produced by means of further auxiliaries.

In the aqueous phase, there may be ionic and/or nonionic, monomeric and/or polymeric surfactants and protective colloids. The selection is made taking into account the technical requirements regarding the cured films.

It has proven advantageous to use polymeric substances which are chemically similar to the constituents of the solid particles and which on curing with actinic radiation and/or thermal curing are able to cocrosslink with the binders present in the solid particles.

Substances of this kind, for the slurry polymers of the invention based on polyacrylates, for example, are polyacrylate protective colloids which are obtained from (meth)acrylates by copolymerization with (meth)acrylic acid and in which some of the carboxyl groups have been neutralized with glycidyl (meth)acrylate and some others have been neutralized with nitrogen bases.

Also particularly suitable are binders free from double bonds, in accordance, for example, with DE 44 13 436 and/or DE 196 00 147, which have been polymerized with fractions of (meth)acrylic acid and which then have been fully or partly neutralized with nitrogen bases. Also preferred in accordance with the invention is the use of binderlike dispersants which contain basic groups and have been (partially) neutralized with acids. A further preferred feature of the present invention is the ability to chose cationic and anionic stabilization freely and, for example, to be able to chose the most cost-effective principle, or that which is easy to carry out chemically, without having to have regard to the chemistry of the crosslinking reaction. For example, the binders according to DE 44 13 436 and DE 196 00 147 are inert to the majority of chemical reactions and are crosslinked only by high-energy irradiation. Such systems may then be applied to various substrates by conventional powder slurry techniques and cured at elevated temperature (above the melting temperature of the resin) by UV radiation or electron beams.

Particularly suitable for the slurry of the invention based on polyurethanes are polyurethane protective colloids which are obtained from isocyanates, polyols, hydroxycarboxylic acids and hydroxy (meth)acrylates and/or hydroxyvinyl ethers and are (partially) neutralized with nitrogen bases. Said protective colloids have a good dispersing action and in many cases also a desired thickening action, and in the course of UV curing are cocrosslinked with the melted powder particles, resulting in extremely weather-resistant coatings.

Also suitable, however, are commercially available substances, such as anionic and cationic soaps, nonionic surfactants based, for example, on polyoxyethylene/polypropylene block polymers or polyoxyethylene fatty acid esters. Also suitable are polyvinylpyrrolidone and polyvinyl alcohol protective colloids, which have good stabilizing and thickening effects. The selection and, where appropriate, the combination of different substances is an optimization task which is known to the skilled worker and which takes place in each individual case in accordance with the requirements relating to the dispersion as regards, for example, pumpability, flow behavior, viscosity or storage conditions, or the requirements relating to the cured coating, e.g., in respect of weathering resistance, overcoatability, gloss, and intercoat adhesion.

As a further significant constituent, the aqueous phase of the slurry of the invention comprises at least one nonionic thickener. Preference is given to using nonionic associative thickeners. This is especially the case when pH values of 4–7 are to be observed.

Structural features of such associative thickeners are a hydrophilic framework which ensures sufficient solubility in water, and hydrophobic groups which are capable of associative interaction in the aqueous medium.

Examples of hydrophobic groups used are long-chain alkyl radicals, such as dodecyl, hexadecyl or octadecyl radicals, for example, or alkaryl radicals, such as octylphenyl or nonylphenyl radicals, for example. Hydrophilic frameworks used are preferably polyacrylates, cellulose ethers or, with particular preference, polyurethanes which comprise the hydrophobic groups as polymer building blocks.

Very particularly preferred hydrophilic frameworks are polyurethanes containing polyether chains as building blocks, preferably comprising polyethylene oxide.

In the synthesis of such polyether polyurethanes, the diisocyanates and/or polyisocyanates, preferably aliphatic diisocyanates, with particular preference unsubstituted or alkyl-substituted 1,6-hexamethylene diisocyanate, serve to link the hydroxyl-terminated polyether building blocks to one another and to link the polyether building blocks to the hydrophobic end group building blocks, which may, for example, be monofunctional alcohols and/or amines having the abovementioned long-chain alkyl radicals or arylalkyl radicals.

One particularly preferred embodiment relates to nonionic associative thickeners which are able to react photochemically with themselves and/or with the other constituents curable with actinic radiation, thereby achieving a further improvement in the properties of the coating. Nonionic associative thickeners curable with actinic radiation may be obtained by incorporating double bonds or groups containing readily abstractable hydrogen atoms, such as dicyclopentadienyl groups and/or photoinitiator groups of the Norrish II type, especially benzophenone groups.

The nonionic thickeners may be used in combination with ionic thickeners. These thickeners normally contain anionic groups and are based in particular on specific polyacrylate resins with acid groups, some or all of which may have been neutralized. Examples of suitable ionic thickeners are known from the textbook "Lackadditive" by Johan Bielemann, Wiley-VCH, Weinheim, N.Y., 1998, pages 31 to 65.

This combination of nonionic thickeners and ionic thickeners is employed in particular when the slurry of the invention is to possess a pseudoplastic behavior.

The amount of the thickeners to be added, and the ratio of ionic to nonionic thickener, is guided by the desired viscosity of the slurry of the invention, which in turn is predetermined by the required sedimentation stability and the specific demands of spray application. The skilled worker is therefore able to determine the amount of the thickeners and the ratio of the thickener types with respect to one another on the basis of simple considerations, possibly with the assistance of preliminary tests.

In accordance with the invention, the viscosity range set is from 50 to 1500 mPas at a shear rate of $1000\ s^{-1}$ and from 150 to 8000 mPas at a shear rate of $10\ s^{-1}$, and also from 180 to 12 000 mPas at a shear rate of $1\ s^{-1}$.

This viscosity behavior, known as "pseudoplasticity", describes a state which does justice both to the requirements of spray application, on the one hand, and to the requirements in terms of storage stability and sedimentation stability, on the other: in the state of motion, such as when pumping the slurry of the invention in circulation in the ring circuit of the coating plant and when spraying, for example, the slurry of the invention adopts a state of low viscosity which ensures easy processability. Without shear stress, on the other hand, the viscosity rises and thus ensures that the coating material already present on the substrate to be coated has a reduced tendency to form runs on vertical surfaces. In the same way, a result of the higher viscosity in the stationary state, such as during storage, for instance, is that sedimentation of the solid particles is very largely prevented, or that any slight degree of settling of the powder slurry of the invention during the storage period may be removed again by agitation.

The slurry of the invention may further comprise dispersing auxiliaries. Examples include aryl polyglycol ethers, octylphenol ethoxylates (partially hydrogenated).

The dispersing auxiliaries which may be used with preference in component B include polyurethanes.

These may consist preferably of
1. at least one organic component containing at least two reactive hydrogen atoms,
2. a monofunctional ether, and
3. a polyisocyanate.

The organic component of the polyurethane composition comprises a polyester polyol, a low molecular mass diol and/or triol, or mixtures thereof. If desired, a trifunctional, hydroxyl-containing monomer may be used.

In a second preferred embodiment, the polyurethane comprises
1. at least one organic component containing at least two reactive hydrogen atoms,
2. a nonionic stabilizer prepared by reacting
    2.1 a monofunctional polyether with a polyisocyanate component, to produce an isocyanate intermediate, and
    2.2 a component containing at least one active amine group and at least two active hydroxyl groups, and
3. at least one polyisocyanate component.

The organic component preferably comprises polyetherpolyesterpolyol, a low molecular mass diol and/or triol, or mixtures thereof.

The polyester component may be prepared by reacting at least one dicarboxylic acid and at least one alcohol component, the alcohol containing at least two hydroxyl groups. The carboxylic acid component contains two or more carboxyl groups.

In addition to the carboxylic acids, the polyester resin may also comprise one or more low molecular mass diols or triols. In principle, any polyol can be used.

The polyester resins used, or mixtures of polyester resins, preferably contain terminal hydroxyl groups. This is brought about by adding an excess of polyols.

For the synthesis of the polyesters it is possible to use both monocarboxylic acids and monoalcohols. Preferably, however, the monocarboxylic acids and/or monoalcohols are present in the polyester resin in a very small amount by weight.

The polyester diol components used with preference comprise between 20 and 80% by weight of the polyurethane resin. The amounts are preferably between 50 and 70% by weight. Very particular preference is given to from 55 to 65% by weight.

The polyurethane is prepared using polyesterpolyols having a molecular weight of between 500 and 5000. Preference is given to molecular weights of between 1000 and 3500.

In addition to the polyesterdiols, the polyurethane resins may comprise further organic components containing at least two reactive hydrogen atoms. These are preferably diols and triols, thiols and/or amines, or mixtures of these substances. The components used to synthesize the polyester component may also be employed here as separate components. In other words, dialcohols or trialcohols, such as neopentyl glycol or 1,6-hexanediol for example, are also suitable as an additional organic component in the polyurethane.

The molecular weight of the diols and/or triols used in the polyurethane resin is between 0 and 20% by weight. Preference is given to from 1 to 6% by weight.

The polyurethane resin additionally contains polyisocyanates, especially diisocyanates. The isocyanates are present at between 5 and 40% by weight, based on the polyurethane mass. Particular preference is given to from 10 to 30% by weight, especially from 10 to 20% by weight. To prepare the polyurethane, finally, a monofunctional polyether is used.

In a second variant, a nonionic stabilizer is prepared by reacting, preferably, a monofunctional polyether with a diisocyanate. The resulting reaction product is then reacted with a component containing at least one active amino group and at least two active hydroxyl groups.

In one particular embodiment, the polyurethane comprises a reaction product of:

1. a polyesterpolyol which in turn is a reaction product of a carboxylic acid containing at least two carboxyl groups and a component containing at least two hydroxyl groups,
2. at least one low molecular mass component containing at least two hydroxyl groups,
3. at least one polyisocyanate component,
4. a nonionic stabilizer prepared by reacting a monofunctional ether with a polyisocyanate and then reacting the resulting reaction product with a component containing at least one active amine group and at least two active hydroxyl groups.

In a fourth variant, the polyurethane comprises a reaction product of:
1. a polyesterpolyol,
2. at least one low molecular mass diol or triol,
3. a polyisocyanate,
4. a monomer containing trihydroxy groups, and
5. a monofunctional polyether containing hydroxy groups.

The polyesters are synthesized using the above-described carboxylic acid components and an excess of polyols. The excess of polyols is chosen so that, preferably, terminal hydroxyl groups are formed. The polyols preferably have a hydroxyl functionality of at least two.

The polyester resin consists preferably of one or more polyols, preferably of a diol. Diols used with preference are alkylene glycols, such as ethylene glycol, propylene glycol, butylene glycol and neopentyl glycol, 1,6-hexanediol or other glycols, such as bisphenol A, cyclohexanedimethanol, caprolactonediol, hydroxyalkylated bisphenol, and similar compounds.

The low molecular mass diols used preferably in accordance with the invention are known from the prior art. They include aliphatic diols, preferably alkylene polyols having 2 to 18 carbon atoms. Examples thereof are 1,4-butanediol, cycloaliphatic diols, such as 1,2-cyclohexanediol and cyclohexanedimethanol.

Suitable organic polyisocyanates in accordance with the invention are preferably those containing at least two isocyanate groups. Particular preference is given to the isocyanates, e.g., p-phenylene diisocyanate, biphenyl 4,4'-diisocyanate, toluene diisocyanates, 3,3'dimetyl-4,4'-biphenylene diisocyanate, 1,4-tetra-methylene diisocyanate, 1,6-hexamethylene diisocyanate, 2,2,4-trimethylhexane 1,6-diisocyanate, methylenebis-(phenyl isocyanates), 1,5-naphthaline diisocyanate, bis(isocyanatoethyl fumarate), isophorone diisocyanate, and methylenebis(4-cyclohexyl isocyanate).

Besides the abovementioned diisocyanates, other polyfunctional isocyanates are also used. Examples are 1,2,4-benzene triisocyanates and polymethylene-polyphenyl isocyanates.

Particular preference is given to using aliphatic diisocyanates, e.g., 1,6-hexamethylene diisocyanate, 1,4-butylene diisocyanate, methylenebis(4-cyclohexyl isocyanate), and isophorone diisocyanate.

Relatively long-chain polyurethane resins may be obtained by chain extension with components containing diol and/or triol groups. Particular preference is given to chain extenders containing at least two active hydrogen groups, e.g., diols, thiols, diamines, or mixtures of these substances, e.g., alkanolamines, aminoalkyl mercaptans, hydroxyalkyl mercaptans, and similar compounds.

Examples of diols used as chain extenders include 1,6-hexanediol, cyclohexanedimethylol and 1,4-butanediol. A particularly preferred diol is neopentyl glycol.

The polyethers which can be used are preferably monofunctional or difunctional polyethers. The monofunctional ones include, for example, those prepared by polymerizing ethylene oxides, propylene oxides or mixtures thereof.

The polyurethane product described may be mixed with the above-described crosslinking agents for thermal crosslinking. It is preferred to use the amino resins, e.g., melamine resins. It is also possible to use condensation products of other amines and amides, e.g., aldehyde condensates of triazines, diazines, triazoles, guanidines, guanamines or alkyl- and aryl-substituted derivatives of such components. Some examples of such components are N,N'-dimethylurea, dicyandiamides, 2-chloro-4,6-diamino-1,3,5-triazines, 6-methyl-2,4-diamino-1,3,5-triazines, 3,5-diaminotriazoles, triamino-pyrimidines, 2-mercapto-4,6-diaminopyrimidines, 2,4,6-tri-ethyltriamino-1,3,5-triazines, and similar substances.

A preferred suitable aldehyde is formaldehyde. It is likewise possible to employ acetaldehyde, crotonaldehyde, acrolein, benzaldehyde, and furfural.

The amine-aldehyde condensation products may comprise methylol or similar alcohol groups. Examples of alcohols which can be used are methanol, ethanol, propanol, butanol, pentanol, hexanol, heptanol, benzyl alcohol and aromatic alcohols, cyclic alcohols such as cyclohexanol, monoethers or glycols, and substituted alcohols, e.g., 3-chloropropanol.

The crosslinking agents described are present in the polyurethane dispersion in amounts of from 2 to 15% by weight, preferably from 4 to 8% by weight.

The polyurethane obtained may be present in the slurry of the invention in a proportion of from 2 to 20% by weight, preferably from 5 to 15% by weight.

The slurry of the invention may be prepared from the solid particles and the aqueous phase by wet milling or by introducing the dry-milled solid particles with stirring. Wet milling is particularly preferred.

Particular preference is given to the wet milling of a predispersion. For this purpose, the solid particles are dispersed in water before or after the auxiliaries and additives described above, using, for example, a high-speed dissolver. It is also possible first of all to add only some of the additives and auxiliaries and to add the rest before or after a subsequent dispersion and/or wet milling step. In certain cases, the predispersion may be processed directly; in general, it is subsequently milled in appropriate mills, e.g., stirred ball mills, in order to adjust it to the desired fineness. Following dispersion, milling is carried out to a target particle size range, if desired, the pH is adjusted to the value determined as function of the system, if desired, and the system is filtered. A specific advantage of the powder slurry of the invention in comparison to powder coating materials is that a very fine particle size spectrum may be processed, e.g., 1–3 µm, at which powder coating materials are no longer applicable, with the result of a surface quality (leveling) unattainable with powders.

Following the dispersion of the solid particles in the aqueous phase, the pH is adjusted preferably to 4.0 to 7.0, with particular preference to 5.5 to 6.5.

The average particle size is between 1 and 200 µm, preferably less than 20 µm, with particular preference from 2 to 10 µm. The solids content of the slurry of the invention is, in particular, between 20 and 50%.

Prior to or following wet milling and/or the introduction of the dry solid particles into the water, the dispersion may be admixed with from 0 to 5% by weight of a defoamer mixture, an ammonium salt and/or alkali metal salt, a carboxyl-functional or nonionic dispersing auxiliary, wetting agent and/or thickener mixture, and the other additives.

Preferably, in accordance with the invention, defoamers, dispersing auxiliaries, wetting agents and/or thickeners are first of all dispersed in water. Then small portions of the solid particles are introduced with stirring. Subsequently, defoamer, dispersing auxiliary, thickener and wetting agent are again incorporated by dispersion. Finally, solid particles are stirred in again, in small portions.

In accordance with the invention, the pH is adjusted preferably using amines, especially in the case of anionically stabilized slurries of the invention. The pH may initially increase here, forming a strongly basic dispersion. However, over the course of several hours or days, the pH drops back to the values indicated above.

Also possible, however, are the dispersions stabilized cationically in the manner described above, in which case the pH is adjusted using acids, preferably volatile carboxylic acids. Also particularly suitable are double-bond-free binders according, for example, to DE 44 13 436 and/or DE 196 00 147, which have been polymerized with fractions of (meth)acrylic acid and which have then been fully or partly neutralized with nitrogen bases. The use of binderlike dispersants containing basic groups and (partially) neutralized with acids is also of advantage. A preferred feature of the present invention is the ability to chose cationic and anionic stabilization freely and, for example, to be able to chose the most cost-effective principle, or that which is easy to carry out chemically, without having to have regard to the chemistry of the crosslinking reaction. For example, the binders according to DE 44 13 436 and DE 196 00 147 are inert to the majority of chemical reactions and are crosslinked only by high-energy irradiation. Such systems may then be applied to various substrates by conventional powder slurry techniques and cured at elevated temperature (above the melting temperature of the resin) by UV radiation or electron beams.

Alternatively, the slurry of the invention may be prepared by mixing ionically stabilizable binders and the crosslinking agents, and also, if desired, the additives and reactive diluents, in organic solution and dispersing them together with the aid of neutralizing agents in water in accordance with the secondary dispersion method. The resulting dispersion is then diluted with water, while stirring. First of all, a water-in-oil emulsion is formed, which on further dilution changes into an oil-in-water emulsion. This point is generally reached at solids contents of <50% by weight, based on the emulsion, and is evident externally from a relatively sharp drop in viscosity during dilution.

The resulting emulsion, still containing solvent, is subsequently freed from solvents by azeotropic distillation.

The distillation temperature is guided primarily by the glass transition temperature Tg of the binders. In order to prevent coagulum, i.e., the flowing together of the particles to form a separate continuous organic phase, in the course of the distillation it is important to keep the distillation temperature below the glass transition temperature Tg. The glass transition temperature may also be described, by way of substitution, by the minimum film formation temperature of the dispersion. The minimum film formation temperature may be determined by drawing down the dispersion on to a glass plate using a coating bar and heating the plate in a gradient oven. The temperature at which the powder-form layer forms a film is referred to as the minimum film formation temperature.

In accordance with the invention it is of advantage if the minimum film formation temperature is more than 20° C., in particular more than 30° C.

In accordance with the invention it is of advantage if the solvents to be removed are distilled off at a distillation temperature below 70° C., preferably below 50° C., and in particular below 40° C. If desired, the distillation pressure in this case is chosen so that, in the case of high-boiling solvents, this temperature range is maintained.

As is most simple, the azeotropic distillation may be effected by stirring the emulsion at room temperature in an open vessel for several days. Preferably, the solvent-containing emulsion is freed from the solvents in a vacuum distillation.

In order to avoid high viscosities, the amount of water and solvents lost by distillation or evaporation is replaced by water. The addition of water may be made before, after or else during the evaporation or distillation, by means of portionwise addition.

After loss of the solvents, the glass transition temperature Tg of the dispersed particles rises, and instead of the previous solvent-containing emulsion (liquid-in-liquid dispersion) a solid-in-liquid dispersion is formed: the slurry of the invention.

To produce the clearcoats of the invention, the slurry of the invention is applied to the substrate that is to be coated. No special measures need be taken here; instead, application may take place in accordance with the customary and known techniques, for example, by the wet-on-wet technique which is employed in automotive OEM finishing, this being a further particular advantage of the slurry of the invention.

Yet another particular advantage of the slurry of the invention is that it is suitable not only for the production of single-coat clearcoats but also for the production of multicoat clearcoat systems, in which case it is used preferably to produce the topmost coat. For the production of these multicoat clearcoat systems it may be combined with all customary and known clearcoat materials. The multicoat clearcoat systems in question exhibit very good intercoat adhesion.

Suitable substrates are all surfaces to be coated that are amenable to combined curing using heat and actinic radiation, examples being metals, plastics, wood, ceramic, stone, textile, fiber composites, leather, glass, glass fibers, glass wool, rock wool, mineral- and resin-bound building materials, such as plasterboard, cement slabs or roof tiles. Accordingly, the slurry of the invention is also suitable for applications outside of automotive finishing, in particular for the coating of furniture and for industrial coating, including coil coating and container coating. The slurry of the invention is particularly suitable as a coating over basecoat materials, preferably in the automotive industry. It is particularly suitable as a clearcoat material over waterborne basecoat materials based on polyesters, polyurethane resins and amino resins.

Following its application, the slurry of the invention dries without problems and does not film at the processing temperature, generally room temperature. In other words, the slurry of the invention applied as a wet film loses water by flashing off at room temperature or at slightly elevated temperatures without the particles present therein altering their original solid form. The pulverulent solid film loses the residual water by evaporation more easily than a flowing wet film. As a result, the risk of bubbles of evaporated water enclosed in the cured film (popping marks) is reduced. Moreover, the tendency toward mud cracking is extremely low. A surprising finding in this context is that the mud cracking tendency of the slurries of the invention is lower the higher their particle sizes.

In the subsequent curing step, the now substantially water-free powder layer is melted and caused to crosslink. In some cases, it may be of advantage to carry out the leveling process and the crosslinking reaction with a chronological offset, by operating in accordance with a staged heating program or a so-called heating ramp. The melted layer is then cured by exposure to actinic radiation, especially UV light. Radiation curing follows thermal curing, in which those regions of the clearcoat film close to the substrate, and/or, in the case of three-dimensional objects, the shadow regions, are fully cured. In general, thermal curing is conducted at temperatures between 120 and 160° C. The corresponding baking time is between 1 and 60 minutes. During this procedure, a particular advantage of the slurry of the invention is manifested: that is, the fact that by way of the ratio of thermally curable constituents to constituents curable with actinic radiation it may be tailored simply and precisely to the thermal load-bearing capacity and/or the three-dimensional form of the substrate to be coated. For instance, in the case of a three-dimensional object having extensive shadow regions, the focus will be placed on thermal curing, and radiation curing will be used only for a first, partial crosslinking. If, on the other hand, the substrate is planar and with little capacity to withstand thermal loads, radiation curing will be predominantly employed. Every gradation between these two extremes is conceivable and also implementable. In accordance with the invention, however, it is also possible to carry out thermal curing—at least in part—before curing with actinic radiation, or to employ both curing methods simultaneously. It is also in accordance with the invention to employ the two curing methods alternately.

With the process of the invention it is possible to achieve film thicknesses of from 10 to 60, preferably from 20 to 60, with particular preference from 20 to 50 μm, most preferably from 25 to 45 μm. Hitherto, in accordance with the prior art, coatings of comparable quality achieved using powder clearcoat materials were possible only by applying film thicknesses of from 65 to 80 μm.

The resultant clearcoat has outstanding performance properties. The clearcoat of the invention adheres firmly to all customary and known basecoat films, or to the above-mentioned substrates. It is of high gloss, smooth, scratch-resistant, weathering-resistant, and free from defects.

EXAMPLES 1 TO 3

Preparation of Inventive Powder Clearcoat Slurries

For the preparation of the inventive powder clearcoat slurries, the thermally curable binder used was an epoxy-containing polyacrylate which contains 23% by weight of glycidyl methacrylate, 7% by weight of ethylhexyl acrylate, 47% by weight of methyl methacrylate, 9% by weight of tert-butylcyclohexyl acrylate and 14% by weight of styrene, in copolymerized form.

The UV-curable binder used was the binder mentioned above whose epoxide groups had all been reacted with acrylic acid.

As the crosslinking agent for thermal curing, dodecanedicarboxylic acid was used.

The photoinitiator used was Irgacure® 2959 from Ciba-Geigy.

The table gives an overview of the composition of the solid particles of the inventive powder clearcoat slurries 1 to 3.

TABLE 1

The composition of the solid particles of the inventive powder clearcoat slurries

| Constituent | Example 1 (parts by wt.) | Example 2 (parts by wt.) | Example 3 (parts by wt.) |
| --- | --- | --- | --- |
| Epoxy resin | 63.6 | 42.4 | 21.2 |
| Dicarboxylic acid | 11.4 | 7.6 | 3.8 |
| Acrylated resin | 25 | 50 | 75 |
| Photoinitiator | 1 | 2 | 3 |

The solid particles of Examples 1 to 3 were prepared by extruding the constituents and subjecting the resultant mixtures to wet milling, as described in the German patent DE-A-196 18 657. During this procedure, a protective colloid (copolymer of vinylpyrrolidone and vinyl propionate) was also added to the mixtures. The resultant inventive powder clearcoat slurries 1 to 3 have a solid particles content of 45% by weight.

The inventive powder clearcoat slurries 1 to 3 were applied to Bonder panels using a cup-type spray gun. The resultant wet films were predried at 60° C. for 5 minutes. The films were then thermally cured at 140° C. for 20 minutes and then exposed to a 120 W mercury vapor lamp for 10 minutes. This gave hard, highly glossy, extremely smooth and chemical-resistant clearcoats with a thickness of from 42 to 43 μm.

Table 2 gives an overview of investigations conducted and the results obtained. To test the chemical resistance, the clearcoats were exposed to defined chemical damage. The chemicals were left to act at 60° C. for 30 minutes. After 24 hours, a visual inspection was made of whether any damage had occurred, evident from spots.

TABLE 2

Testing the hardness and the chemical resistance
Pencil hardness chemical resistance at 60° C.

| Example No. | (DIN 46 453) | $H_2SO_4$ 1% strength | NaOH 1% strength | Pancreatin | $H_2O$ |
| --- | --- | --- | --- | --- | --- |
| 1 | H–2H | − | − | − | + |
| 2 | 2H | − | − | + | + |
| 3 | 3H | − | + | + | + |

− = visible spots
+ = no spots visible

The results of Table 2 underscore the high hardness and chemical resistance of the clearcoats of the invention.

The invention claimed is:

1. A powder slurry curable thermally and with actinic radiation, comprising at least one crosslinking agent for thermal curing, at least one photoinitiator, and at least one constituents containing a functional groups (A) and a complementary functional group (B), wherein the functional group (A) is curable with actinic radiation and the functional group (B) is curable thermally, said functional groups (A) and (B) being present in a molar ratio of from 100:1 to 1:100, such that the powder slurry is curable thermally and with actinic radiation;

wherein the powder slurry comprises solid particles in a liquid, and the constituents containing the functional groups (A) and the constituents containing the functional groups (B) are present together in the solid particles, and the powder slurry has a viscosity of (i) from 50 to 1500 mPas at a shear rate of 1000 s$^{-1}$,
(ii) from 150 to 8000 mPas at a shear rate of 10 s$^{-1}$, and
(iii) from 180 to 12000 mPas at a shear rate of 1 s$^{-1}$.

2. The powder slurry as claimed in claim 1, having a solid particles content of from 10 to 60% by weight.

3. The powder slurry as claimed in claim 1, comprising constituents containing at least functional groups (A) which render them curable with actinic radiation, and constituents containing at least complementary functional groups (B), which render them curable thermally, in a weight ratio of from 50:1 to 1:50.

4. The powder slurry as claimed in claim 1, comprising thermally curable solid particles and at least one of actinic radiation curable emulsions and/or actinic radiation curable dispersions.

5. The powder slurry as claimed in claim 1, comprising thermally curable solid particles and at least one of thermally curable dispersions and/or thermally curable emulsions.

6. The powder slurry as claimed in claim 1, comprising at least one of emulsions and/or dispersions curable by at least one of thermally and/or with actinic radiation.

7. The powder slurry of claim 1, wherein the thermally curable constituents are binders that comprise at least one of polyacrylates, polyesters, alkyd resins, and polyurethanes, and the actinic radiation curable constituents are binders that comprise at least one of (meth)acryloyl-functional (meth)acrylic copolymers, polyether acrylates, polyester acrylates, unsaturated polyesters, epoxy acrylates, urethane acrylates, amino acrylates, melamine acrylates, silicone acrylates, and corresponding methacrylates of any of the preceding.

8. The powder slurry of claim 1, wherein the powder slurry is one of a clearcoat material for an automotive OEM finishing, a clearcoat material for an automotive refinish, an industrial coating, a coil coating, a container coating, or a furniture coating.

9. A curable clearcoat material prepared from the powder slurry of claim 1.

10. The powder slurry of claim 1 further characterized by at least two of the following:

i) the powder slurry has a solid particles content of from 10 to 60% by weight;
ii) the powder slurry comprises solid particles in a liquid, and wherein the constituents containing the functional groups (A) and the constituents containing the functional groups (B) are present together in the solid particles;
iii) the constituents containing the functional groups (A) and the constituents containing the functional groups (B) are present in solid particles that are different from one another;
iv) the powder slurry comprises thermally curable solid particles and at least one of actinic radiation curable emulsions and actinic radiation curable dispersions;
v) the powder slurry comprises thermally curable solid particles and at least one of thermally curable dispersions and thermally curable emulsions;
vi) the powder slurry comprises at least one of emulsions and dispersions curable by at least one of thermally and with actinic radiation; and/or
vii) the thermally curable constituents are binders that comprise at least one of polyacrylates, polyesters, alkyd resins, and polyurethanes, and the actinic radiation curable constituents are binders that comprise at least one of (meth)acryloyl-functional (meth)acrylic copolymers, polyether acrylates, polyester acrylates, unsaturated polyesters, epoxy acrylates, urethane acrylates, amino acrylates, melamine acrylates, silicone acrylates, and corresponding methacrylates of any of the preceding.

11. The powder slurry of claim 10, wherein the powder slurry is one of a clearcoat material for an automotive OEM finishing, a clearcoat material for an automotive refinish, an industrial coating, a coil coating, a container coating, or a furniture coating.

12. A curable clearcoat material prepared from the powder slurry of claim 10.

* * * * *